United States Patent
Ishihara

(10) Patent No.: US 8,457,881 B2
(45) Date of Patent: Jun. 4, 2013

(54) IMAGE CAPTURING SYSTEM FOR VEHICLE

(75) Inventor: Masamitsu Ishihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 13/000,068

(22) PCT Filed: Jul. 14, 2009

(86) PCT No.: PCT/JP2009/003297
§ 371 (c)(1),
(2), (4) Date: Dec. 20, 2010

(87) PCT Pub. No.: WO2010/026695
PCT Pub. Date: Mar. 11, 2010

(65) Prior Publication Data
US 2011/0106434 A1     May 5, 2011

(30) Foreign Application Priority Data

Sep. 3, 2008   (JP) .................................. 2008-225991

(51) Int. Cl.
*G01C 21/34*  (2006.01)
*G01C 21/36*  (2006.01)
*H04N 5/232*  (2006.01)

(52) U.S. Cl.
USPC .......................................... 701/411; 348/148

(58) Field of Classification Search
USPC ....................................................... 701/202
See application file for complete search history.

(56) References Cited

U.S. PATENT DOCUMENTS

| 5,892,855 A * | 4/1999 | Kakinami et al. ............. 382/291 |
| 7,756,298 B2 * | 7/2010 | Miyahara et al. ............. 382/104 |
| 2005/0222753 A1 | 10/2005 | Ishikawa |
| 2006/0271286 A1 * | 11/2006 | Rosenberg .................... 701/211 |
| 2006/0280494 A1 | 12/2006 | Tosa |
| 2007/0110331 A1 * | 5/2007 | Satoh ............................ 382/275 |
| 2008/0051997 A1 * | 2/2008 | Rosenberg .................... 701/211 |
| 2008/0059036 A1 * | 3/2008 | Imai et al. ....................... 701/93 |

FOREIGN PATENT DOCUMENTS

| JP | 8-297736 A | 11/1996 |
| JP | 2001-197351 A | 7/2001 |
| JP | 2001-257920 A | 9/2001 |
| JP | 2005-318519 A | 11/2005 |
| JP | 2006-174253 A | 6/2006 |
| JP | 2006-352257 A | 12/2006 |

* cited by examiner

*Primary Examiner* — Shelley Chen
(74) *Attorney, Agent, or Firm* — Birch, Stewart, Kolasch & Birch, LLP

(57) ABSTRACT

An image capturing system for vehicle includes an object-to-be-captured information storage unit (12a) for storing information about an object to be captured on a map, a camera (18) for capturing an image of the object to be captured, an object-to-be-captured position determining unit (27) for determining a distance from the current position to the object to be captured, and the direction of the object to be captured, a camera control unit (28) for controlling the camera to orient the camera toward the determined direction, and to focus the camera on the determined distance, a determining unit (30) for determining whether or not an image captured by the camera is a clearly-captured one, and an information storage unit (17) for, when the determining unit determines that the captured image is a clearly-captured one, storing the image therein.

11 Claims, 11 Drawing Sheets

(a)

(b)

IMAGE CAPTURING SYSTEM FOR VEHICLE

FIELD OF THE INVENTION

The present invention relates to an image capturing system for vehicle that captures an image of an object by using a camera mounted on a vehicle.

BACKGROUND OF THE INVENTION

It is very dangerous for a driver to have a camera in his or her hand to capture an image of an object while driving a vehicle. Even in a case in which a fellow passenger captures an image of an object, the camera which the fellow passenger has in his or her hand is not stabilized while the driver drives the vehicle and it is therefore difficult to provide an image free from camera movement. Furthermore, because a vehicle does not necessarily travel at a constant speed, it is difficult to specify the time of capturing an image at a capture point outside the vehicle.

In order to solve this problem, patent reference 1 discloses a vehicle-mounted image capturing device that captures an image of a scene appearing in a direction at which the driver desires to look at a predetermined image capture position to display the image. This vehicle-mounted image capturing device includes five image capturing cameras mounted on a vehicle, for capturing an image of an object on a forward left side of the vehicle, an image of an object on a forward right side of the vehicle, an image of an object on a backward left side of the vehicle, an image of an object on a backward right side of the vehicle, and an image of an object on a back side of the vehicle. Image capturing conditions including the predetermined image capture position, an image capturing camera used for image capturing, a traveling direction, a gear transmission shift position, and a vehicle speed are pre-registered into an external memory. When the current position of the vehicle detected by a position detector is the predetermined image capture position or close to the predetermined image capture position and the image capturing conditions are satisfied, the vehicle-mounted image capturing device captures an image of a scene appearing outside the vehicle by using the specified image capturing camera, and displays the image on a display unit. Furthermore, information about a recommended image capture point is downloaded from a server, and the recommended image capture point is automatically set as an image capture point.

Furthermore, patent reference 2 discloses an image capturing system for vehicle that can capture an image of an object safely even when the vehicle is travelling and that can automatically capture an image of an object to be captured without causing a passenger to perform a certain operation when the position of the object to be captured has been determined beforehand. This image capturing system for vehicle detects the position of the vehicle by using a main part of a navigation system and records information about objects to be imaged, such as buildings and sightseeing areas on map information recorded in a map CD, into an MO disk, and also specifies an object to be captured recorded in the MO disk by using an image capturing condition input unit. A determining means then determines the distance and heading of the vehicle from the vehicle position detected by the main part of the navigation system on the map information recorded in the map CD to the object to be captured specified by the image capturing condition input unit, and, when the determined distance reaches a predetermined distance or the determined heading reaches a predetermined heading, carries out image capturing using a camera.

RELATED ART DOCUMENT

Patent Reference

Patent reference 1: JP, 2005-318519, A
Patent reference 2: JP, 08-297736, A

SUMMARY OF THE INVENTION

A problem with the above-mentioned conventional technologies is, however, that it is difficult for a person who has no knowledge about an object to be captured (the location and size of the object, surrounding obstacles, etc.) to find a position where the object can be captured by a camera mounted on the vehicle, or a direction of the vehicle in which an image of the object can be easily captured. On the other hand, when the user visits an unknown area, such as a sightseeing area, the user requires a great deal of time to find out famous buildings in the area, places symbolizing the area, etc.

The image capturing system for vehicle disclosed by above-mentioned patent reference 2 sets an object to be captured so as to capture an image of the object automatically without causing the driver and a fellow passenger to perform a certain operation on the system, though the user needs to determine a route leading to a location close to an image capture location, or set an image capture location as a destination by using the navigation system by himself or herself so as to go to the image capture location because the image capturing system for vehicle cannot capture an image of the object in consideration of the route to the destination.

A further problem with the vehicle-mounted image capturing device disclosed by patent reference 1 is that the vehicle-mounted image capturing device stores a recommended image capture point for a route specified by the user and captures an image of an object at the capture point, though this vehicle-mounted image capturing device does not take into consideration a possibility that it fails in capturing an image of an object which the user truly desires to capture. Furthermore, there is a possibility that the vehicle-mounted image capturing device captures an image of an object which does not have to be captured.

The present invention is made in order to solve the above-mentioned problems, and it is therefore an object of the present invention to provide an image capturing system for vehicle that can capture an image of an object safely and correctly while saving the user from having to perform a certain operation even when the vehicle is travelling.

In order to solve the above-mentioned problems, there is provided an image capturing system for vehicle including: a current position detecting unit for detecting a current position; a map information storage unit for storing map information; an object-to-be-captured information storage unit for storing information about an object to be captured on a map shown by the map information stored in the map information storage unit as object-to-be-captured information; a camera for capturing an image of the object to be captured while a vehicle travels; an object-to-be-captured position determining unit for determining both a distance from the current position detected by the current position detecting unit to the object to be captured shown by the object-to-be-captured information stored in the object-to-be-captured information storage unit, and a direction of the object to be captured, on a basis of the map information stored in the map information storage unit; a camera control unit for controlling the camera to orient the camera toward the direction determined by the object-to-be-captured position determining unit, and to focus the camera on the determined distance; an image capture commanding unit for commanding the camera controlled by the camera control unit to capture an image; a determining unit for determining whether or not the image which is captured by the camera in response to the command from the image capture commanding unit is a clearly-captured one of the object to be captured; and an information storage unit for, when the determining unit determines that the image captured by the camera is a clearly-captured one of the object to be captured, storing the image therein.

Because the image capturing system for vehicle in accordance with the present invention is constructed in such a way as to determine both the distance from the current position to an object to be captured pre-stored in the object-to-be-captured information storage unit, and the direction of this object to be captured, orient the camera toward this determined direction, focus the camera on the determined distance to command the camera to capture an image of the object to be captured, determine whether or not the image acquired through the image capturing using the camera in response to this command is a clearly-captured one of the object to be captured, and, when determining that the image acquired through the image capturing is a clearly-captured one of the object to be captured, store the image acquired through the image capturing using the camera therein, the image capturing system for vehicle can capture an image of an object to be captured automatically without the need for the driver to look at the screen of the image capturing system for vehicle even when the vehicle is traveling. As a result, the image capturing system for vehicle can capture an image of an object to be captured safely and correctly even when the vehicle is traveling. Furthermore, the user does not have to consider at which point an object to be captured can be captured satisfactorily, via which route he or she should drive the vehicle to capture an image of an object to be captured satisfactorily, etc. In addition, the user does not have to check where a famous object to be captured is and then input the address, the building name, or the like of the famous object to be captured so as to cause the image capturing system for vehicle to capture an image of the famous object to be captured. The image capturing system for vehicle can thus save the user from having to do any operation which requires a great deal of time to capture an image of such an object to be captured.

EMBODIMENTS OF THE INVENTION

Hereafter, in order to explain this invention in greater detail, the preferred embodiments of the present invention will be described with reference to the accompanying drawings.

Embodiment 1

Figure 1:
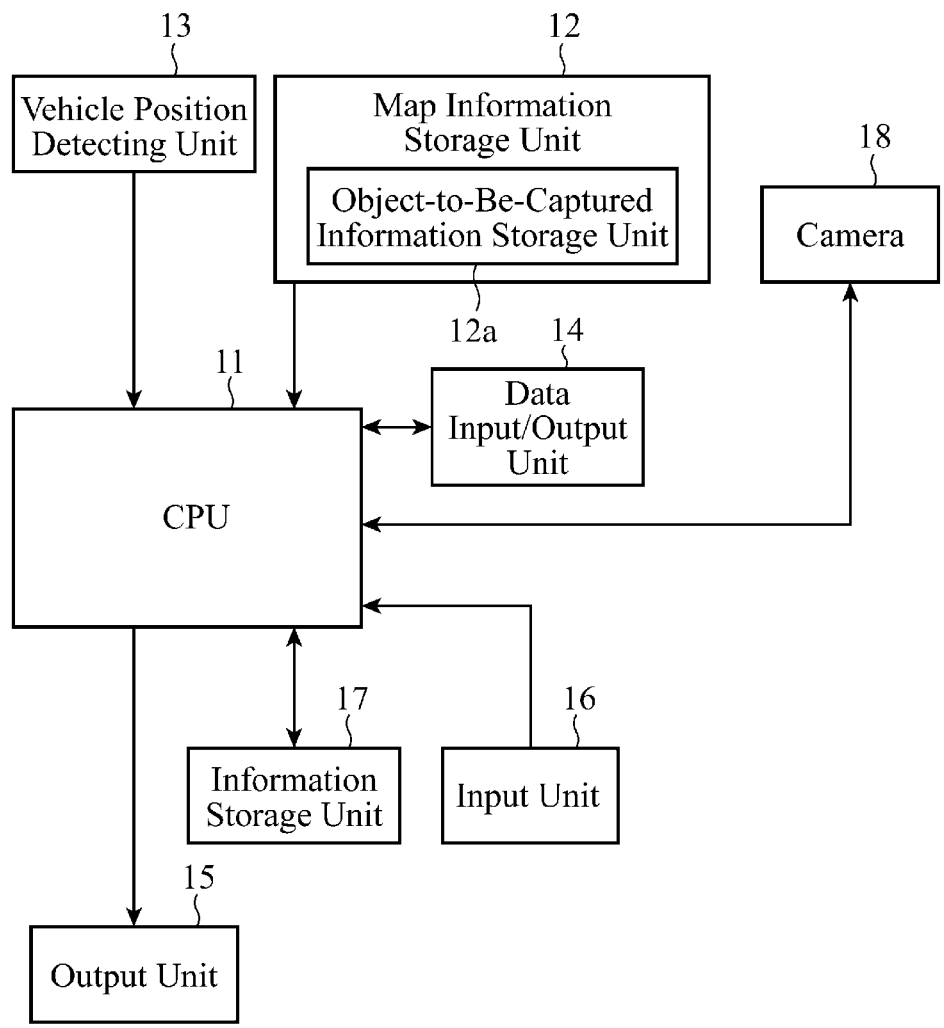
FIG. 1 is a block diagram showing the structure of an image capturing system for vehicle in accordance with Embodiment 1 of the present invention.

FIG. 1 is a block diagram showing the structure of an image capturing system for vehicle in accordance with Embodiment 1 of the present invention. Hereafter, an explanation will be made assuming that this image capturing system for vehicle is mounted in equipment mounted in a vehicle and having navigation functions.

The image capturing system for vehicle is provided with a CPU (Central Processing Unit) 11, a map information storage unit 12, a vehicle position detecting unit 13, a data input/output unit 14, an output unit 15, an input unit 16, an information storage unit 17, and a camera 18. The map information storage unit 12 includes an object-to-be-captured information storage unit 12a.

The CPU 11 operates according to a control program read from the information storage unit 17 so as to carryout various numerical computations, information processing, or appliance control to control the whole of the image capturing system for vehicle. The details of this CPU 11 will be mentioned later.

The map information storage unit 12 stores map information therein. The map information stored in this map information storage unit 12 is read by the CPU 11. The object-to-be-captured information storage unit 12a stores object-to-be-captured information therein. The object-to-be-captured information consists of information about objects to be imaged such as famous buildings and sightseeing areas on a map, e.g., information about image capturing, such as the height of each building, the direction of each building, or a place where an image of each building can be captured (a road or position where an image of each building can be captured). The object-to-be-captured information stored in this object-to-be-captured information storage unit 12*a* is read by the CPU 11.

The vehicle position detecting unit 13 is comprised of a GPS (Global Positioning System) receiver and a dead reckoning sensor (not shown in the figure). The GPS receiver receives radio waves from GPS satellites orbiting around the Earth so as to determine the latitude and longitude of the vehicle according to data included in these received radio waves. The latitude and longitude which are determined by this GPS receiver are informed to the CPU 11 as a current position signal. The dead reckoning sensor is comprised of a speed sensor and a heading sensor (gyro), and the speed sensor sends a vehicle speed signal to the CPU 11 and the heading sensor sends a heading signal to the CPU 11.

The data input/output unit 14 is comprised of a storage medium in and from which data can be written and read, such as a USB (Universal Serial Bus) memory or a DVD (Digital Versatile Disk), for example, and transmits and receives data to and from the CPU 11. This data input/output unit 14 is used for the image capturing system to read image data from the information storage unit 17 via the CPU 11 and to store image data in the information storage unit 17 via the CPU 11.

The output unit 15 includes a display unit and a speaker, for example. The display unit displays an image according to an image signal sent thereto from the CPU 11. The speaker outputs a guidance voice according to a sound signal sent thereto from the CPU 11. This output unit 15 is used in order for the image capturing system to mainly present an image acquired through image capturing to the user and to inform a choice of operations to the user.

The input unit 16 is comprised of at least one of operation buttons disposed in, for example, a vehicle-mounted unit, a remote controller (remote control), a touch panel placed on the screen of the display unit which constructs the output unit 15, a voice recognition device, and so on, and is used for a selection of an object-to-be-captured candidate, an input of image capture settings, an input of a destination at the time of a route search, and so on. Data inputted from this input unit 16 are sent to the CPU 11.

The information storage unit 17 is comprised of an HDD (Hard Disk Drive), for example, and is accessed by the CPU 11. Image data acquired through, for example, image capturing using the camera 18 are stored in this information storage unit 17 via the CPU 11. Various control programs are also stored in this information storage unit 17, and are read by the CPU 11.

Figure 2:
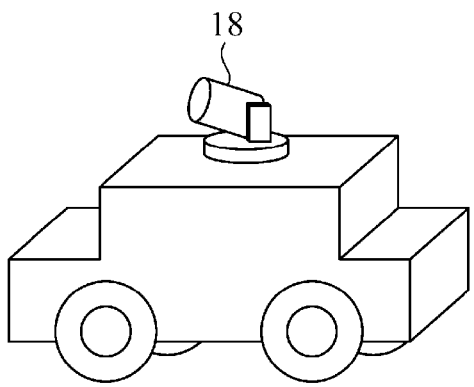
FIG. 2 is a view showing an example of a position where a camera for use in the image capturing system for vehicle in accordance with Embodiment 1 of the present invention is mounted to a vehicle.

The camera 18 captures an image of an object to be captured while the vehicle travels. Image data about the image acquired through the image capturing using this camera 18 are sent to the CPU 11. As shown in FIG. 2, the camera 18 can be mounted on the roof of the vehicle, for example. The cameras 18 can be either a one that captures a moving image or a one that captures a still image. Furthermore, the camera 18 can be alternatively installed inside the vehicle, instead of being installed outside the vehicle. In addition, the number of cameras 18 is not limited to one, and two or more cameras can be installed.

Figure 3:
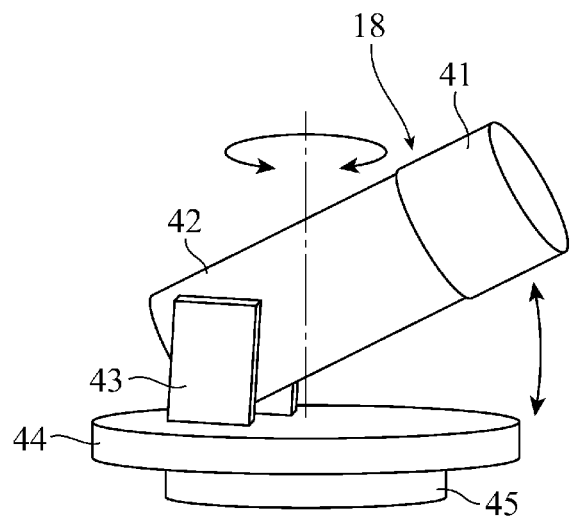
FIG. 3 is a view showing the camera and a drive mechanism for driving the camera for use in the image capturing system for vehicle in accordance with Embodiment 1 of the present invention.

This camera 18 is mounted onto the vehicle in such a way as to be able to rotate both in an azimuth direction and in an elevation angle direction. FIG. 3 is a view showing the camera 18 and a drive mechanism of driving the camera 18. The camera 18 has a lens 41 mounted at an end of a main part 42 thereof. The drive mechanism is comprised of a base 45 for fixing the camera 18 to the vehicle, a base 44 that can freely rotate in the azimuth direction with respect to this base 45, and an elevation adjustment mechanism 43 for adjusting the angle of elevation of the main part 42.

Figure 4:
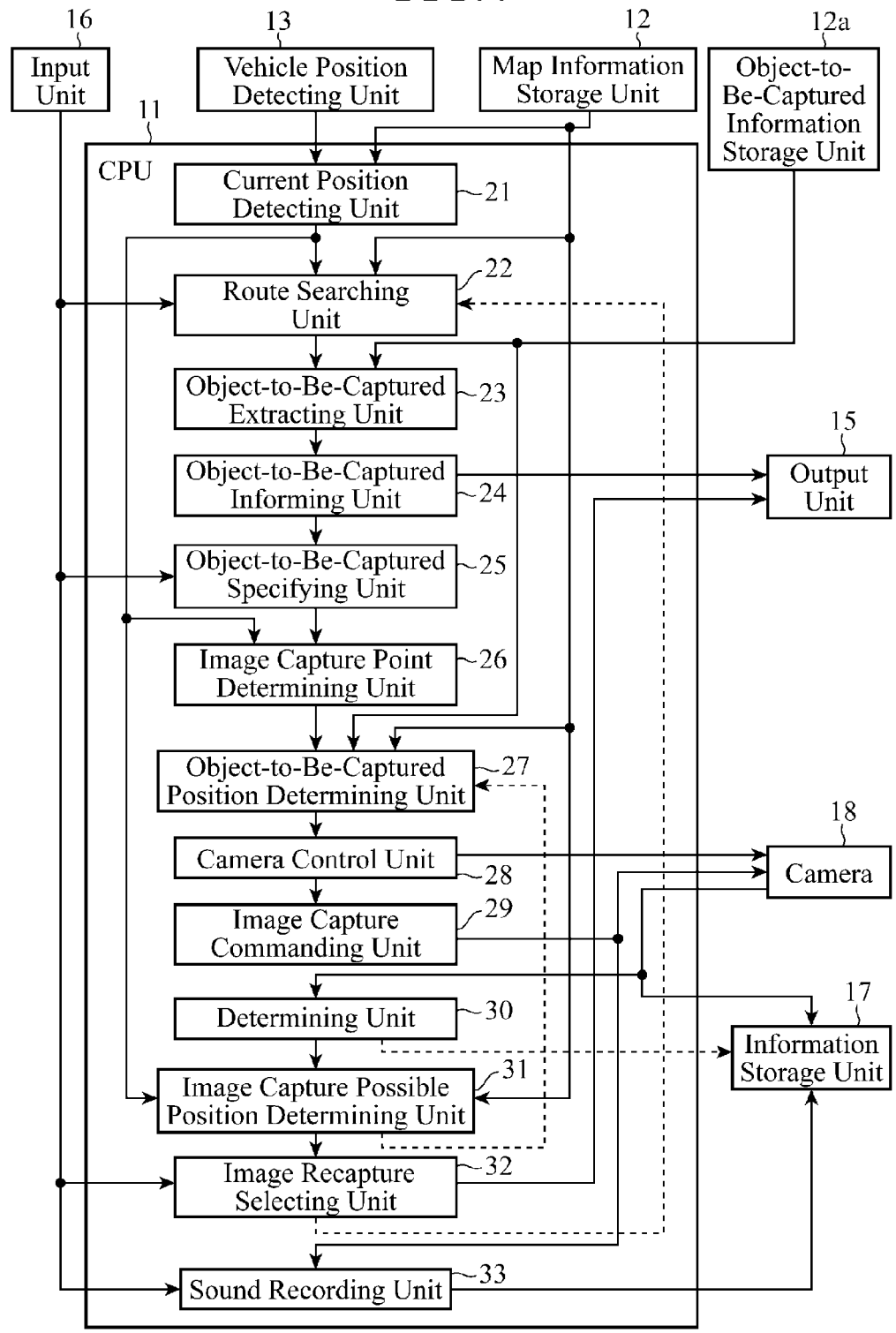
FIG. 4 is a block diagram showing the functional structure of a CPU for use in the image capturing system for vehicle in accordance with Embodiment 1 of the present invention.

Next, the details of the CPU 11 will be explained. FIG. 4 is a block diagram showing the functional structure of the CPU 11. This CPU 11 is provided with a current position detecting unit 21, a route searching unit 22, an object-to-be-captured extracting unit 23, an object-to-be-captured informing unit 24, an object-to-be-captured specifying unit 25, an image capture point determining unit 26, an object-to-be-captured position determining unit 27, a camera control unit 28, an image capture commanding unit 29, a determining unit 30, an image capture possible position determining unit 31, and an image recapture selecting unit 32.

The current position detecting unit 21 detects the current position of the vehicle on the map shown by the map information read from the map information storage unit 12 according to the current position signal sent thereto from the vehicle position detecting unit 13, the vehicle speed signal, and the heading signal. The current position of the vehicle detected by this current position detecting unit 21 is informed to the route searching unit 22, the image capture point determining unit 26, and the image capture possible position determining unit 31 as current position data.

The route searching unit 22 determines a route from the current position shown by the current position data sent thereto from the current position detecting unit 21 to the destination inputted via the input unit 16 according to the map information read from the map information storage unit 12. The route determined by this route searching unit 22 is informed to the object-to-be-captured extracting unit 23 as route data.

The object-to-be-captured extracting unit 23 acquires the pieces of object-to-be-captured information corresponding to objects to be imaged existing along the route shown by the route data sent thereto from the route searching unit 22 from the object-to-be-captured information storage unit 12*a*, and then extracts objects to be imaged which can be captured from among the objects to be imaged shown by the acquired pieces of object-to-be-captured information as object-to-be-captured candidates. The object-to-be-captured candidates extracted by this object-to-be-captured extracting unit 23 are informed, as object-to-be-captured candidate data, not only to the output unit 15 but also to the object-to-be-captured informing unit 24.

The object-to-be-captured informing unit 24 sends the object-to-be-captured candidate data sent thereto from the object-to-be-captured extracting unit 23 to the output unit 15 and the object-to-be-captured specifying unit 25. As a result, the object-to-be-captured candidates are displayed on the display unit of the output unit 15.

The object-to-be-captured specifying unit 25 selects an object-to-be-captured candidate which the object-to-be-captured specifying unit is commanded to select via the input unit 16 from the object-to-be-captured candidates shown by the object-to-be-captured candidate data sent thereto from the object-to-be-captured informing unit 24. In this case, the object-to-be-captured specifying unit can select only one object-to-be-captured candidate. As an alternative, the object-to-be-captured specifying unit can select a plurality of object-to-be-captured candidates. The one or more object-to-be-captured candidates selected by this object-to-be-captured specifying unit 25 are informed to the image capture point determining unit 26 as object-to-be-captured data.

The image capture point determining unit 26 checks to see whether or not the current position shown by the current position data sent thereto from the current position detecting unit 21 has reached a position (referred to as an "image capture point" from here on) where the camera can capture an image of one object to be captured shown by the object-to-be-captured data sent thereto from the object-to-be-captured specifying unit 25, and, when determining that the current position has reached an image capture point, informs the object-to-be-captured position determining unit 27 that the current position has reached the image capture point.

Figure 5:
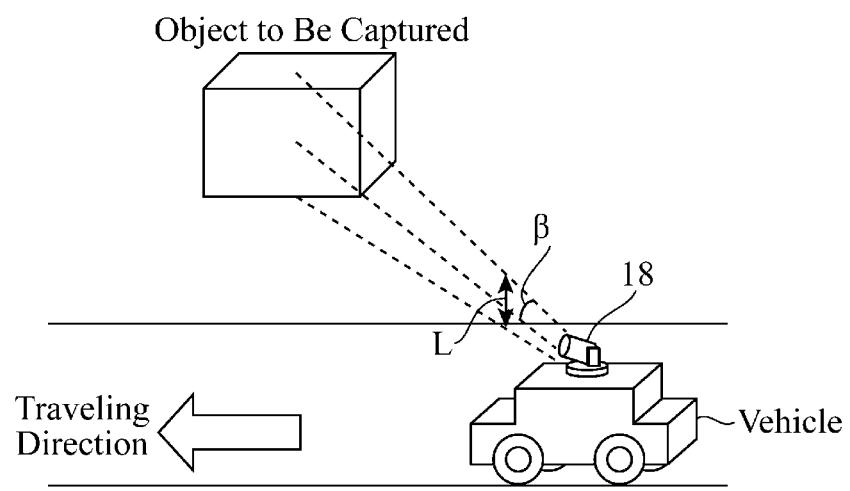
FIG. 5 is a view for explaining a relationship between the camera and an object to be captured at the time of determination of the position of the object to be captured which is carried out by the image capturing system for vehicle in accordance with Embodiment 1 of the present invention.
Figure 5:
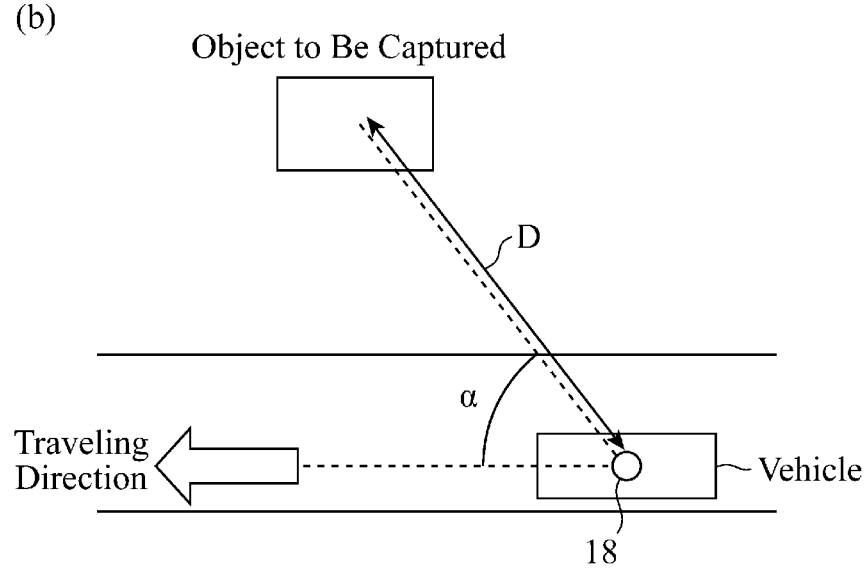

When receiving the notification showing that the current position has reached the image capture point from the image capture point determining unit 26, the object-to-be-captured position determining unit 27 determines the distance D from the camera 18 to the object to be captured, the azimuthal angle α of the object to be captured, the angle of elevation β with respect to the center of the object to be captured, and the size L of the object to be captured on the basis of the current position shown by the current position data sent thereto from the current position detecting unit 21, the map information read from the map information storage unit 12, the object-to-be-captured information read from the object-to-be-captured information storage unit 12a. The set of the azimuthal angle α and the angle of elevation β with respect to the object to be captured is referred to as the "direction of the object to be captured". FIG. 5(a) is a perspective view for explaining a relationship between the camera 18 at the time of the determination of the position of the object to be captured, and the object to be captured, and FIG. 5(b) is a plane view for explaining the relationship. The distance D, the azimuthal angle α, the angle of elevation β, and the size L which are determined by this object-to-be-captured position determining unit 27 are informed to the camera control unit 28 as camera control data.

The camera control unit 28 controls the azimuthal angle and angle of elevation of the camera 18 according to the camera control data sent thereto from the object-to-be-captured position determining unit 27 in such a way that the object to be captured is framed within a picture frame, and also controls the camera 18 to focus the camera 18 on the object to be captured. The control operation of focusing the camera on the object to be captured is carried out by changing the focus of the lens 41 of the camera 18 according to the distance D informed thereto from the object-to-be-captured position determining unit 27. When the control operations by the camera control unit 28 have been completed, the image capture commanding unit 29 is informed that the control operations have been completed.

The image capture commanding unit 29 commands the camera 18 to capture an image of the object to be captured in response to the notification sent thereto from the camera control unit 28 and showing that the control operations have been completed. As a result, image capturing using the camera 18 is carried out. Image data acquired through the image capturing using the camera 18 are sent to the information storage unit 17 and the determining unit 30.

Because the determining unit 30 may be unable to determine whether or not the camera 18 has captured an image of the object to be captured clearly only by controlling the camera 18 using the camera control unit 28, the determining unit 30 directly determines whether or not the camera 18 has captured an image of the object to be captured clearly. In this case, "the camera has captured an image of the object to be captured clearly" means that the image has been captured in a state in which the object to be captured is not obstructed by any object such as a building other than the object to be captured or a moving object including a vehicle other than the vehicle. For example, when a non-intended building or moving object is located between the camera 18 and the object to be captured, an image out of focus (henceforth an "out of focus image") may be acquired. The determining unit 30 determines whether or not the captured image is an out of focus image by using image recognition.

Figure 6:
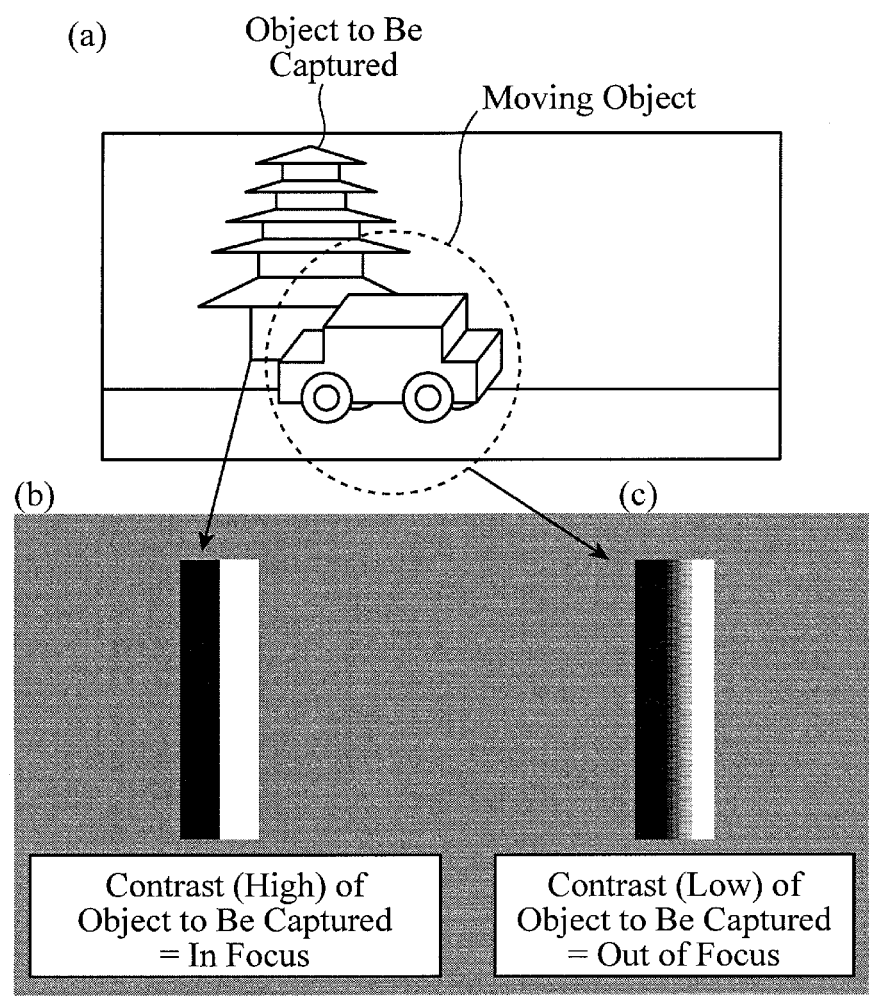
FIG. 6 is a view for explaining image recognition carried out by a determining unit of the image capturing system for vehicle in accordance with Embodiment 1 of the present invention.

For example, if the camera focuses on an object to be captured as shown in FIG. 6(a), it is determined by using image recognition that an image of the object to be captured shows a high contrast as shown in FIG. 6(b). In this case, because the camera does not focus on a moving object existing in front of the object to be captured, an image of the object to be captured is out of focus and shows a low contrast as shown in FIG. 6(c). By using these characteristics, the determining unit 30 determines that the captured image is out of focus when the image has a contrast difference smaller than a fixed value. More specifically, when determining that something which the image capturing system does not desire to capture has entered the picture frame→an out of focus image has been acquired→the image has a small contrast, the determining unit 30 determines that the image of the object to be captured which the camera has captured is not a clearly-captured one. The determination result acquired by this determining unit 30 is sent to the image capture possible position determining unit 31.

When the determination result sent thereto from the determining unit 30 shows that the image of the object to be captured which the camera has captured is not a clearly-captured one, the image capture possible position determining unit 31 determines whether or not the current position shown by the current position data sent thereto from the current position detecting unit 21 is a position where the image capturing system can capture an image of the object to be captured using the camera 18 according to the map information stored in the map information storage unit 12. When determining that the current position is not a position where the image capturing system can capture an image of the object to be captured using the camera 18, this image capture possible position determining unit 31 informs the image recapture selecting unit 32 to that effect. In this case, the image capture possible position determining unit can be constructed in such a way as to inform the output unit 15 that the image capturing system cannot capture an image of the object to be captured so as to inform the user about this. In contrast, when determining that the current position is a position where the image capturing system can capture an image of the object to be captured using the camera 18, the image capture possible position determining unit 31 starts the object-to-be-captured position determining unit 27 again.

When being informed from the image capture possible position determining unit 31 that the current position is not a position where the image capturing system can capture an image of the object to be captured using the camera 18, the image recapture selecting unit 32 outputs a message showing that the current position is not a position where the image capturing system can capture an image of the object to be captured to the output unit 15 so as to urge the user to select whether or not to cause the image capturing system to recapture an image of the object to be captured. When receiving a command of recapturing an image which is inputted, via the input unit 16, by the user in response to the message, the image recapture selecting unit 32 restarts the route searching unit 22. The route searching unit 22 re-searches for a route from the current position detected by the current position detecting unit 21, via a point where the camera can capture an image of the object to be captured which is to be recaptured, to the destination already set up. In contrast, when receiving a command of not recapturing any image which is inputted, via the input unit 16, by the user in response to the message, the image recapture selecting unit 32 does not carry out any process.

Next, the operation of the image capturing system for vehicle in accordance with Embodiment 1 of the present invention which is constructed as above will be explained with reference to a flow chart shown in FIG. 7.

First, a setup of a destination is carried out (step ST11). More specifically, the user inputs a destination by using the input unit 16. Data showing the destination inputted from this input unit 16 are sent to the route searching unit 22.

A route search is then carried out and a list of object-to-be-captured candidates is made (step ST12). More specifically, the route searching unit 22 searches for a route from the current position shown by the current position data sent thereto from the current position detecting unit 21 to the destination shown by the data sent thereto from the input unit 16 (the destination set up in step ST11). This route which is searched for by the route searching unit 22 is informed to the object-to-be-captured extracting unit 23 as route data.

The object-to-be-captured extracting unit 23 which has received the route data sent thereto from the route searching unit 22 acquires the object-to-be-captured information corresponding to the objects to be imaged existing along the route shown by this route data from the object-to-be-captured information storage unit 12*a*, extracts the objects to be imaged which can be captured by the camera from among the objects to be imaged shown by this acquired object-to-be-captured information as object-to-be-captured candidates, and informs these object-to-be-captured candidates to the object-to-be-captured informing unit 24 as object-to-be-captured candidate data. The object-to-be-captured informing unit 24 sends the object-to-be-captured candidate data sent thereto from the object-to-be-captured extracting unit 23 to the output unit 15 and the object-to-be-captured specifying unit 25. As a result, the object-to-be-captured candidates are displayed on the display unit of the output unit 15 in a list form.

A selection of an object-to-be-captured candidate is then performed (step ST13). More specifically, the object-to-be-captured specifying unit 25 selects an object-to-be-captured candidate which the object-to-be-captured specifying unit is commanded to select via the input unit 16 from among the object-to-be-captured candidates shown by the object-to-be-captured candidate data sent thereto from the object-to-be-captured informing unit 24. This object-to-be-captured candidate selected by the object-to-be-captured specifying unit 25 is informed to the image capture point determining unit 26 as object-to-be-captured data. After performing the above-mentioned operation, the user drives his or her vehicle toward the destination.

Whether or not the vehicle has reached an image capture point is then checked to see (step ST14). More specifically, the image capture point determining unit 26 checks to see whether the current position shown by the current position data sent thereto from the current position detecting unit 21 has reached a position where the camera can capture an image of an object to be captured shown by the object-to-be-captured data sent thereto from the object-to-be-captured specifying unit 25, i.e., an image capture point. When, in this step ST14, determining that the current position is not an image capture point, the image capture point determining unit stands by while repeatedly carrying out this step ST14. In contrast, when, in step ST14, determining that the current position is an image capture point, the image capture point determining unit 26 informs the object-to-be-captured position determining unit 27 that the current position has reached an image capture point.

The position of the object to be captured is then determined (step ST15). More specifically, when receiving the notification showing that the current position has reached an image capture point from the image capture point determining unit 26, the object-to-be-captured position determining unit 27 determines the distance D from the camera 18 to the object to be captured, the azimuthal angle α of the object to be captured, the angle of elevation β with respect to the center of the object to be captured, and the size L of the object to be captured on the basis of the current position shown by the current position data sent thereto from the current position detecting unit 21, the map information read from the map information storage unit 12, the object-to-be-captured information read from the object-to-be-captured information storage unit 12*a*. The camera control unit 28 controls the azimuthal angle and angle of elevation of the camera 18 according to the camera control data sent thereto from the object-to-be-captured position determining unit 27 in such a way that the object to be captured is framed within a picture frame, and also controls the camera 18 to focus the camera 18 on the object to be captured. When the control operations by the camera control unit 28 have been completed, the image capture commanding unit 29 is informed that the control operations have been completed.

Figure 8:
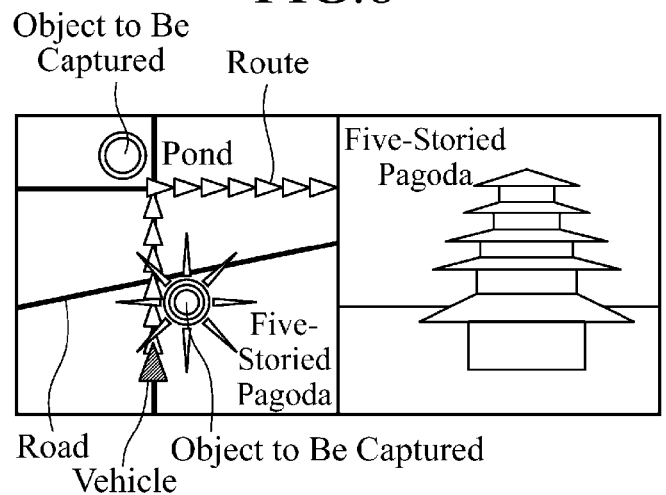
FIG. 8 is a view showing an example of an image displayed when the image capturing system for vehicle in accordance with Embodiment 1 of the present invention captures an object to be captured.

Image capturing is then carried out (step ST16). More specifically, the image capture commanding unit 29 commands the camera 18 to capture an image of the object to be captured in response to the notification sent thereto from the camera control unit 28 and showing that the control operations have been completed. Accordingly, image capturing using the camera 18 is carried out. Image data acquired through the image capturing using the camera 18 are sent to the information storage unit 17 and the determining unit 30. In this case, the image capturing system can display such an image as shown in FIG. 8 on the display unit of the output unit 15 according to the image data acquired through the image capturing using the camera 18. FIG. 8 shows an example of a split screen on which a map and the captured image are displayed separately, and the map is displayed on one part of the split screen and a "five-storied pagoda" which is the object to be captured is displayed on the other part of the split screen. Because a "pond" which is another object to be captured is scheduled to be captured when the vehicle reaches the image capture point for the pond, this pond is marked so as to enable the user to recognize the schedule.

It is then checked to see whether the camera has captured the object to be captured clearly (step ST17). Concretely, the determining unit 30 determines whether or not the image shown by the image data sent thereto from the camera 18 is a clearly-captured one of the object to be captured, in other words, whether or not the captured image is out of focus, by using image recognition. This determination result acquired by the determining unit 30 is sent to the image capture possible position determining unit 31.

When it is determined in this step ST17 that the camera has not captured the object to be captured clearly, it is then checked to see whether or not the object to be captured is located within an image capture possible area (step ST20). More specifically, the image capture possible position determining unit 31 determines whether the current position shown by the current position data sent thereto from the current position detecting unit 21 is a one which falls within the area where the camera 18 can capture an image of the object to be captured according to the map information stored in the map information storage unit 12.

Figure 9:
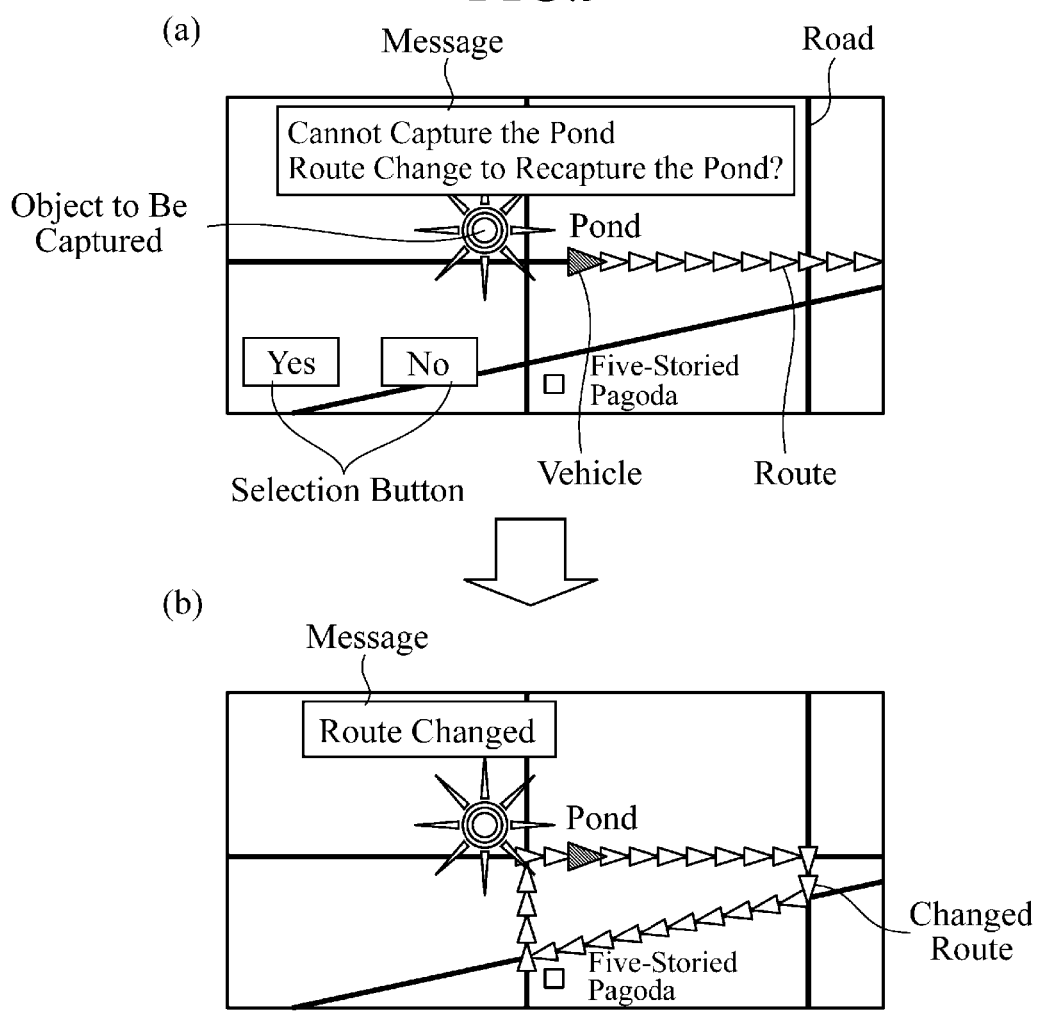
FIG. 9 is a view showing an example of an image displayed on an output unit when the image capturing system for vehicle in accordance with Embodiment 1 of the present invention selects to recapture an object to be captured.

When it is determined in this step ST20 that the object to be captured is located within the image capture possible area, the image capturing system for vehicle returns the sequence to step ST15 and carries out the above-mentioned object-to-be-captured position determining process again. In contrast, when it is determined in step ST20 that the object to be captured is not located within the image capture possible area, it is checked to see whether or not to capture the object to be captured again (step ST21). More specifically, when determining that the object to be captured is not located within the image capture possible area, and the camera cannot capture an image of the object, the image capture possible position determining unit 31 informs the image recapture selecting unit 32 to that effect. The image recapture selecting unit 32 which has received this notification outputs both a message showing that the object to be captured cannot be captured, such as "Cannot capture the pond. Will you make a route change to recapture the pond?" and selection buttons "yes" and "no" for allowing the user to determine whether or not to recapture an image of the object to be captured to the output unit 15, as shown in FIG. 9(*a*), so as to enable the user to make a selection of whether or not to recapture an image of the object to be captured.

The image capture possible position determining unit 31 can be constructed in such a way as to, before carrying out step ST21, output a message showing that the camera cannot capture an image of the object to the output unit 15 to inform the user to that effect when determining that the object to be captured is not located within the image capture possible area.

When it is determined in step ST21 that the object to be captured will be recaptured, that is, when the user selects "yes" by using the input unit 16, a re-search for a route is then made (step ST22). More specifically, the image recapture selecting unit 32 restarts the route searching unit 22. As a result, the route searching unit 22 re-searches for a route from the current position shown by the current position data sent thereto from the current position detecting unit 21 to the already set-up destination via the point where the camera can capture an image of the object to be captured to be recaptured, and, when completing this re-search, and outputs a message "The route has been changed", as shown in FIG. 9(*b*), showing the change of the route and the changed route to the output unit 15. After that, the image capturing system for vehicle advances the sequence to step ST14.

When it is determined in above-mentioned step ST21 that the object to be captured will not be recaptured, that is, when the user selects "no" by using the input unit 16, the image capturing system advances the sequence to step ST14. In this case, the image capturing system for vehicle does not carry out image recapturing of the object to be captured and shifts to the processes to be performed on the next object to be captured.

When it is determined in above-mentioned step ST17 that the camera has captured a clear image of the object to be captured, image data about the image are then stored (step ST18). More specifically, the determining unit 30 commands the information storage unit 17 to store the image data therein. As a result, the image data sent from the camera 18 are stored in the information storage unit 17. It is then checked to see whether the vehicle has reached the destination (step ST19). When it is determined in this step ST19 that the vehicle has not reached the destination yet, the image capturing system returns the sequence to step ST14 and repeats the above-mentioned processing. In contrast, when it is determined in step ST19 that the vehicle has reached the destination, the image capturing system ends the processing.

When an image of a person who can be identified is included in the image captured in step ST16, the image capturing system can discard the captured image data. This discarding can be carried out by deleting the image data stored in the information storage unit 17, or by stopping the storage of the image data in the information storage unit 17. Furthermore, whether or not an image of a person who can be identified is included in the captured image can be determined by the determining unit 30 using image recognition or the like. According to this structure, a problem of portrait rights can be prevented from arising.

Furthermore, image capturing conditions including an image capturing angle, the distance from the object to be captured to the camera 18, and the direction and size of the object to be captured can be set up via the input unit 16 which serves as an image capturing conditions setting unit before the image capturing is carried out, and the object-to-be-captured extracting unit 23 can determine whether each object to be captured existing along the route which is searched for by the route searching unit 22 satisfies the image capturing conditions set up via the input unit 16 by using the information about the workings of the camera 18, and the information including the image capture point and height of each object to be captured which is recorded in the object-to-be-captured information storage unit 12*a* so as to extract only objects to be imaged satisfying the image capturing conditions.

Furthermore, a microphone can be disposed in the input unit 16 in such a way that a voice can be recorded at the same time when the image capturing is carried out. More specifically, a sound recording unit 33 is disposed in the CPU 11, and the image capture commanding unit 29 commands the sound recording unit 33 to record a voice at the same time when commanding the camera 18 to capture an image of the object to be captured. In response to the command from the image capture commanding unit 29, the sound recording unit 33 inputs a sound signal sent from the microphone of the input unit 16, and stores the sound signal in the information storage unit 17 as sound data.

In this case, the sound recording unit can be constructed in such a way as to record a voice for about several seconds when the image acquired by the camera 18 is a still image, and to record a voice in synchronization with the image capturing when the image acquired by the camera is a moving image. The sound recording unit can be constructed in such a way as to receive a sound recording time from the input unit 16 when the image acquired by the camera is a still image. Furthermore, the sound recording unit can be constructed in such a way as to store sound data acquired from the microphone in the information storage unit 17 in synchronization with the image capturing when the image acquired by the camera is a moving image. When the image acquired by the camera is a still image, the voice can be stored while being associated with a sound having an arbitrary time.

As previously explained, because the image capturing system for vehicle in accordance with Embodiment 1 of the present invention is constructed in such a way as to determine both the distance from the current position to an object to be captured pre-stored in the object-to-be-captured information storage unit 12*a*, and the direction of this object to be captured, orient the camera toward this determined direction, focus the camera on the determined distance to command the camera to capture an image of the object to be captured, determine whether or not the image acquired through the image capturing using the camera in response to this command is a clearly-captured one of the object to be captured, and, when determining that the image acquired through the image capturing is a clearly-captured one of the object to be captured, store the image acquired through the image capturing using the camera therein, the image capturing system for vehicle can capture the object to be captured automatically even when the vehicle is travelling without requesting the driver to look at the screen. As a result, the image capturing system for vehicle can capture the object to be captured safely and correctly even when the vehicle is travelling.

Furthermore, because the image capturing system for vehicle stores objects to be imaged in the object-to-be-captured information storage unit 12a in advance, the user does not have to consider at which point an object to be captured can be captured satisfactorily, via which route he or she should drive the vehicle to capture an image of an object to be captured satisfactorily, etc. In addition, the user does not have to check where a famous object to be captured is and then input the address, the building name, or the like of the famous object to be captured so as to cause the image capturing system for vehicle to capture an image of the famous object to be captured. The image capturing system for vehicle can thus save the user from having to do any operation which requires a great deal of time to capture an image of such an object to be captured.

Embodiment 2

An image capturing system for vehicle in accordance with Embodiment 2 of the present invention is constructed in such a way as to, when a destination is set up and a route is also set up, directly specify an object to be captured not existing along the route so as to capture an image of the object to be captured. The image capturing system for vehicle in accordance with this Embodiment 2 has the same structure as the image capturing system for vehicle in accordance with Embodiment 1.

In the image capturing system for vehicle in accordance with Embodiment 2, because the number of candidates which should be selected increases as the number of objects to be imaged, which are targets for the selection, infinitely increases, and this increase is out of touch with reality, image capturing conditions are added. For example, objects to be imaged which the user can select are limited to what exists at a fixed distance or less from the route. More specifically, an object-to-be-captured extracting unit 23 lists the objects to be imaged which are located at the fixed distance or less from the set-up route so as to allow the user to select an object to be captured from them. In addition, the object-to-be-captured extracting unit can be constructed in such a way as to directly specify an object to be captured on a map, or input an address or a telephone number to directly specify an object to be captured, thereby limiting the objects to be imaged which the user can select to the specified object to be captured. A route searching unit 22 carries out a route change in such a way that the vehicle will pass a position where a camera 18 can capture an image of the selected object to be captured.

Figure 10:
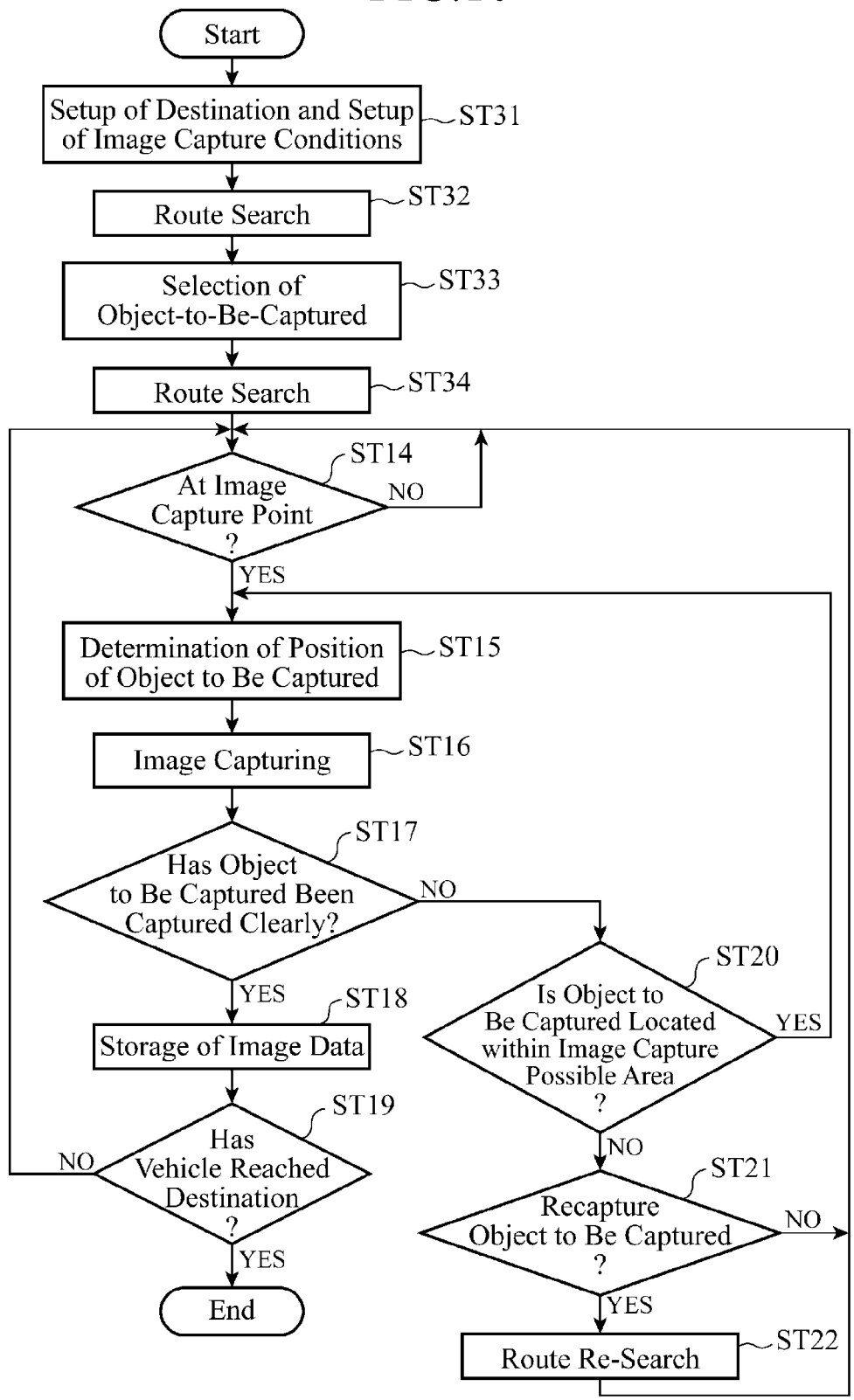
FIG. 10 is a flow chart showing the operation of an image capturing system for vehicle in accordance with Embodiment 2 of the present invention.

Next, the operation of the image capturing system for vehicle in accordance with Embodiment 2 of the present invention will be explained with reference to a flow chart shown in FIG. 10.

First, a setup of a destination and a setup of image capturing conditions are made (step ST31). More specifically, the user inputs his or her destination and image capturing conditions by using an input unit 16. Data showing the destination inputted from this input unit 16 is sent to the route searching unit 22, and data showing the image capturing conditions inputted from the input unit 16 are sent to the object-to-be-captured extracting unit 23.

A route search is then carried out (step ST32). More specifically, the route searching unit 22 searches for and sets up a route from the current position shown by current position data sent thereto from a current position detecting unit 21 to the destination shown by the data inputted in step ST31 and sent thereto from the input unit 16. This route which is searched for by the route searching unit 22 is informed to the object-to-be-captured extracting unit 23 as route data. After performing the above-mentioned operation, the user drives his or her vehicle toward the destination.

Then, before the vehicle has reached the destination, an object to be captured is selected (step ST33). More specifically, the object-to-be-captured extracting unit 23 lists the objects to be imaged which are located at the fixed distance or less from the set-up route, and displays them on a display unit of an output unit 15. The user then directly specify an object to be captured by selecting the one of the listed objects to be imaged, directly specifying the object to be captured on a map, or inputs the address or telephone number of the object to be captured.

A route search is then carried out (step ST34). More specifically, the route searching unit 22 searches for a route from the current position shown by the current position data sent thereto from the current position detecting unit 21, via a position where the camera 18 can capture an image of the object to be captured selected in step ST33, to the destination to change the already-set-up route.

Figure 7:
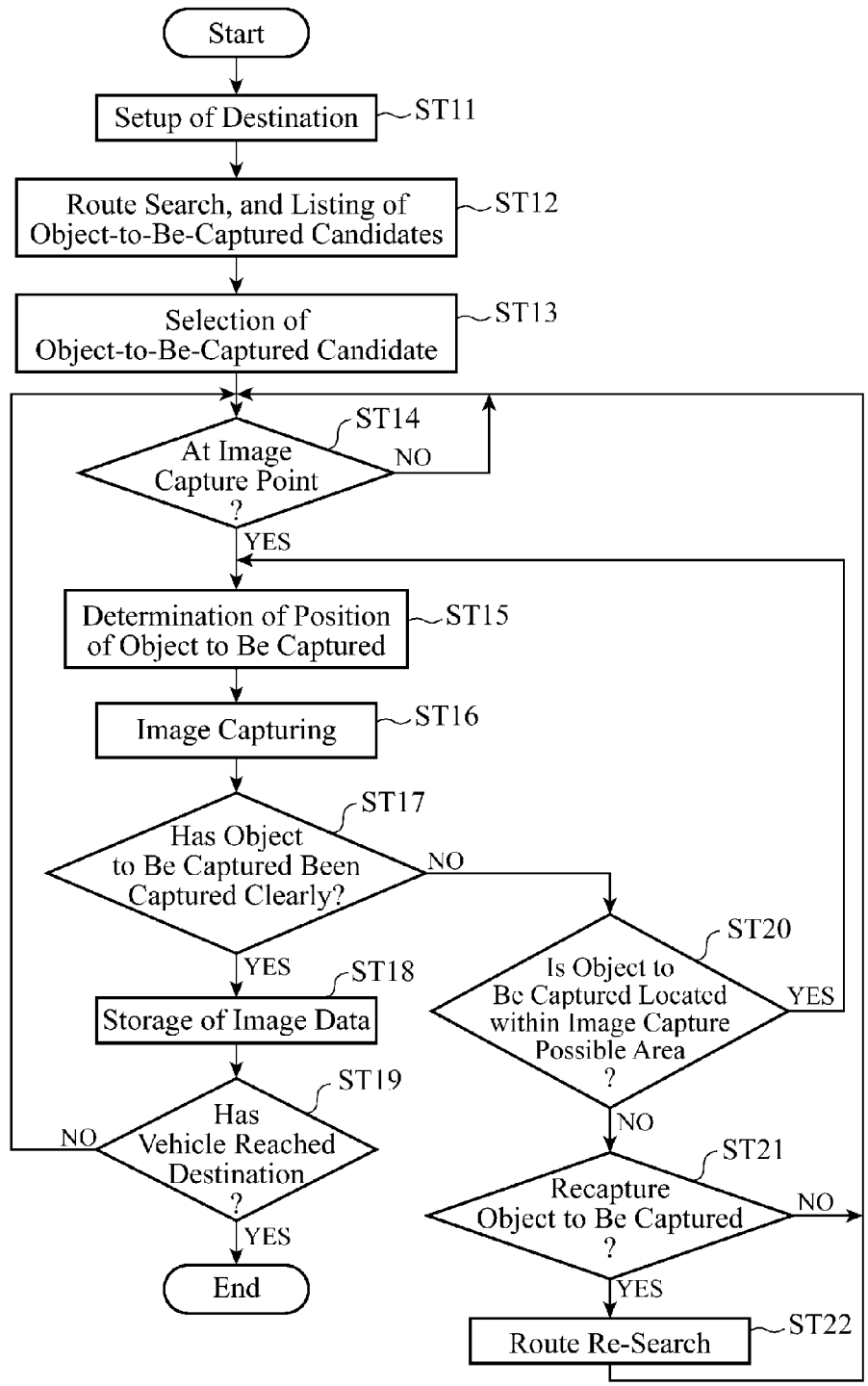
FIG. 7 is a flow chart showing the operation of the image capturing system for vehicle in accordance with Embodiment 1 of the present invention.

Processes in step ST14 and subsequent steps are the same as those performed by the image capturing system for vehicle in accordance with Embodiment 1 shown in the flow chart of FIG. 7.

The image capturing system for vehicle in accordance with this Embodiment 2 can capture an image of either an object to be captured which does not exist along the route to the destination or an object to be captured which is not recorded in an object-to-be-captured information storage unit 12a, unlike the image capturing system for vehicle in accordance with Embodiment 1.

The image capturing system for vehicle in accordance with this Embodiment 2 can be constructed in such a way as to extract object-to-be-captured candidates existing along the route by using the object-to-be-captured extracting unit 23 at the time when the route is changed so as to allow the user to select, as an additional object to be captured, an object-to-be-captured candidate from them, like the image capturing system for vehicle in accordance with Embodiment 1.

Furthermore, the image capturing system for vehicle in accordance with this Embodiment 2 can be constructed in such a way as to directly specify an object to be captured when no destination is set up so as to capture an image of the object to be captured. In this case, the user registers an object to be captured on the map, or the address, telephone number or the like of an object to be captured by using the input unit 16. The route searching unit 22 searches for and sets up a route from the current position shown by the current position data sent thereto from the current position detecting unit 21 via a position where the camera 18 can capture an image of the object to be captured registered. However, because no destination is set up in this case, the position where the camera 18 can capture an image of the object to be captured is set as the destination. Furthermore, the image capturing system for vehicle in accordance with this Embodiment 2 can be constructed in such a way as to extract object-to-be-captured candidates existing along the route by using the object-to-be-captured extracting unit 23 after setting up the route so as to allow the user to select, as an additional object to be captured, one object-to-be-captured candidate from them, like the image capturing system for vehicle in accordance with Embodiment 1.

Embodiment 3

An image capturing system for vehicle in accordance with Embodiment 3 of the present invention is constructed in such a way as to capture an image of an object to be captured corresponding to object-to-be-captured information stored in an object-to-be-captured information storage unit 12*a* when no destination is set up.

Figure 11:
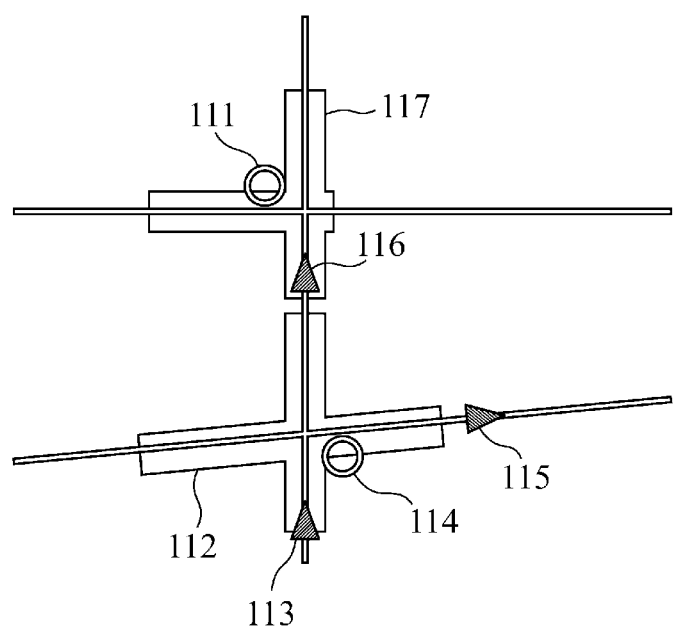
FIG. 11 is a view for explaining an image capture possible position in an image capturing system for vehicle in accordance with Embodiment 3 of the present invention.

In the image capturing system for vehicle in accordance with this Embodiment 3, a camera 18 captures an image of an object to be captured when the vehicle is located within an image capture possible area in which the camera can capture an image of the object to be captured. Furthermore, information about the image capture possible area is included in the object-to-be-captured information recorded in the object-to-be-captured information storage unit 12*a*. FIG. 11 is a view for explaining an image capture possible area. An image capture possible area associated with an object to be captured 111 is an area 117. Similarly, an image capture possible area associated with an object to be captured is an area 112. Each of reference numerals 113, 115, and 116 shows the current position of the vehicle.

The image capturing system for vehicle in accordance with this Embodiment 3 has the same structure as the image capturing system for vehicle in accordance with Embodiment 1, except for the following points. More specifically, the functions of an image capture point determining unit 26 included in a CPU 11 of the image capturing system for vehicle in accordance with Embodiment 1 are modified as will be mentioned below. This image capture point determining unit 26 whose functions are modified is referred to as an "image capture possible object detecting unit" from here on, though not illustrated.

The image capture possible object detecting unit detects that the current position shown by current position data sent from a current position detecting unit 21 has moved closer to a position where the camera can capture an image of an object to be captured stored in the object-to-be-captured information storage unit 12*a*, and informs a camera control unit 28 to that effect.

Figure 12:
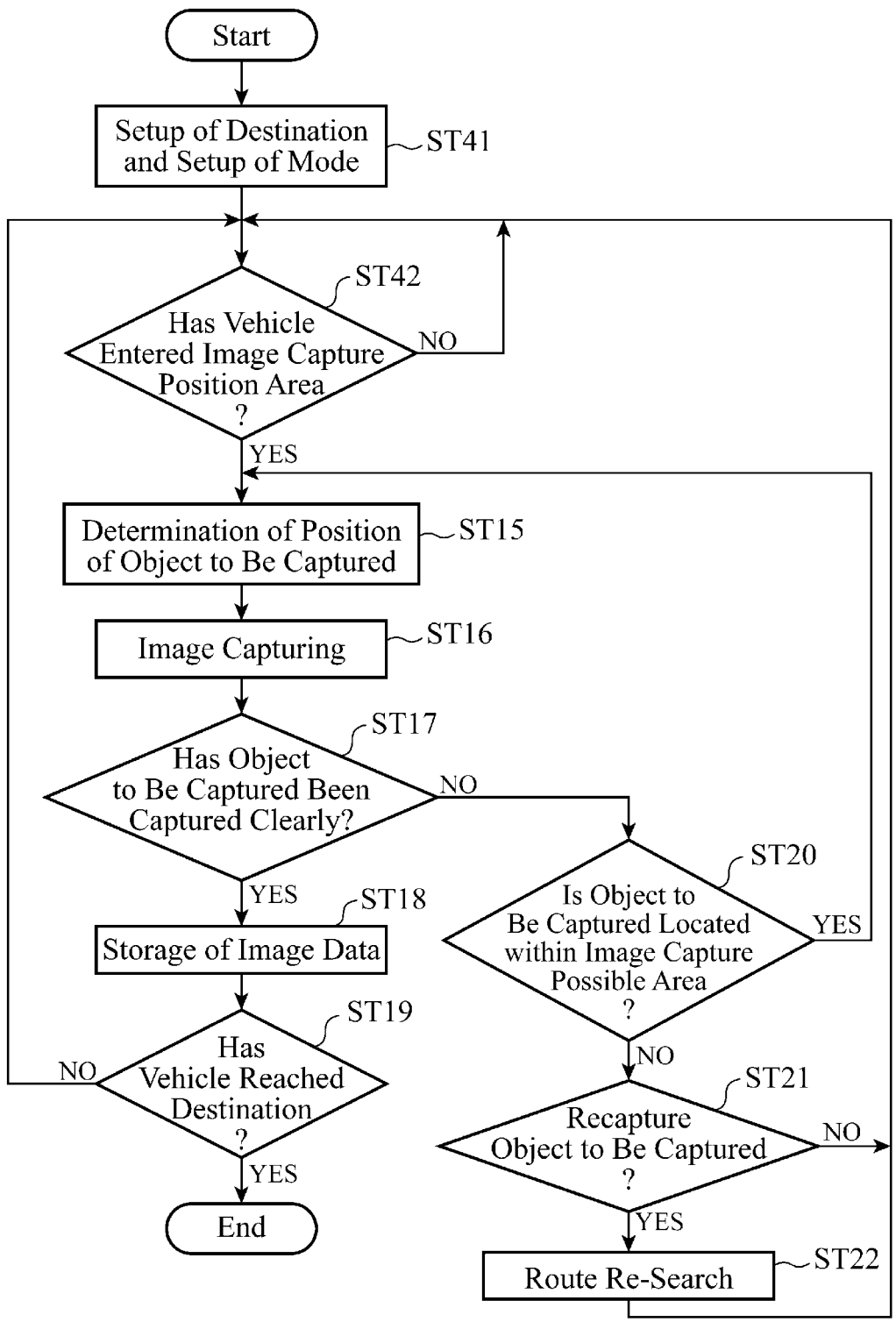
FIG. 12 is a flow chart showing the operation of the image capturing system for vehicle in accordance with Embodiment 3 of the present invention.

Next, the operation of the image capturing system for vehicle in accordance with Embodiment 3 of the present invention will be explained in detail with reference to a flow chart shown in FIG. 12. Steps in which the same processes as those performed by the image capturing system for vehicle in accordance with Embodiment 1 shown in the flow chart of FIG. 7 are carried out are designated by the same reference characters as those shown in the flow chart of FIG. 7, and the explanation of the steps will be simplified.

First, a setup of image capturing conditions is made and a setup of a mode is also made (step ST41). More specifically, the user inputs image capturing conditions and sets up a mode by using an input unit 16. Data showing the image capturing conditions input via this input unit 16 are sent to an object-to-be-captured extracting unit 23. Furthermore, data showing the mode are sent to an image recapture selecting unit 32. After performing the above-mentioned operation, the user drives his or her vehicle toward the destination.

It is then checked to see whether the vehicle has entered an image capture position area (step ST42). More specifically, the image capture possible object detecting unit determines whether the current position shown by the current position data sent from the current position detecting unit 21 has moved closer to a position where the camera can capture an image of an object to be captured stored in the object-to-be-captured information storage unit 12*a*. In this case, because the vehicle has entered the area 112 when the vehicle is located at the current position 113, as shown in FIG. 11, it is determined that the camera can capture an image of the object to be captured 114. Similarly, because the vehicle has entered the area 117 when the vehicle is located at the current position 116, it is determined that the camera can capture an image of the object to be captured 111. However, because the vehicle has entered neither of the image capture possible areas when the vehicle is located at the current position 115, it is determined that no object to be captured which can be captured exists at the current position. In this case, no image capturing is carried out and it is then checked to see whether the vehicle has entered an image capture position area.

When it is determined in step ST42 that the vehicle has entered an image capture position area, the position of a corresponding object to be captured is then determined (step ST15). Image capturing is then carried out (step ST16). It is then checked to see whether the camera has captured the object to be captured clearly (step ST17). When it is determined in this step ST17 that the camera has not captured the object to be captured clearly, it is then checked to see whether or not the object to be captured is located within the image capture possible area (step ST20). When it is determined in this step ST20 that the object to be captured is located within the image capture possible area, the image capturing system returns the sequence to step ST15 and carries out the above-mentioned object-to-be-captured position determining process again.

In contrast, when it is determined in step ST20 that the object to be captured is not located within the image capture possible area, the process according to the mode set up in step ST41 is carried out. When a mode in which the user is allowed to select whether or not to cause the image capturing system to recapture an image of object to be captured is set up in step ST21, it is checked to see whether or not to recapture an image of the object to be captured (step ST21).

When it is determined in this step ST21 that the image capturing system will recapture an image of object to be captured, a re-search for a route is then carried out (step ST22). More specifically, the image recapture selecting unit 32 restarts the route searching unit 22. As a result, the route searching unit 22 sets, as a destination, a point where the camera can capture an image of the object to be captured to be recaptured, and re-searches for a route from the current position detected by the current position detecting unit 21 to the destination so as to set up the new route. Because no destination is set up first in the case of the image capturing system for vehicle in accordance with Embodiment 3, a point where the camera can capture an image of the object to be captured is set as the destination. After that, the image capturing system advances the sequence to step ST42. Therefore, when the user drives the vehicle according to the set-up route, the image capturing system can recapture an image of the object to be captured.

In contrast, when it is determined in step ST21 that the image capturing system will not recapture an image of object to be captured, the image capturing system advances the sequence to step ST42. In this case, the image capturing system does not carry out image capturing of the object to be captured, but shifts to the processes on the next object to be captured.

When a mode in which the user is not allowed to select whether or not to cause the image capturing system to recapture an image of object to be captured is set up in step ST41, and it is determined in step ST20 that the object to be captured is not located within the image capture possible area, the image capturing system stops the image capturing process, and therefore the vehicle continues to travel until the vehicle moves closer to the next object to be captured.

When it is determined in above-mentioned step ST17 that the camera has captured the object to be captured clearly, the image data are then stored (step ST18). It is then checked to see whether the vehicle has completed its travel (step ST19). In the image capturing system for vehicle in accordance with this Embodiment 3, because no destination is set up, it is determined whether or not to end the processing by determining whether the vehicle has completed its travel, e.g., whether or not the vehicle has been at rest. When it is determined in this step ST19 that the vehicle has not completed its travel, the image capturing system returns the sequence to step ST42 and repeats the above-mentioned processing. In contrast, when it is determined in this step ST19 that the vehicle has completed its travel, the image capturing system ends the processing.

Embodiment 4

An image capturing system for vehicle in accordance with Embodiment 4 of the present invention is constructed in such a way as to capture an image of an object in the vicinity of a vehicle irrespective of whether or not the object is an object to be captured, define an object associated with an image which the image capturing system is commanded to register by the user, among images acquired through the image capturing, as an object to be captured, and store object-to-be-captured information about this object to be captured in an object-to-be-captured information storage unit 12a.

The image capturing system for vehicle in accordance with this Embodiment 4 has the same structure as the image capturing system for vehicle in accordance with Embodiment 1. However, the image capturing system for vehicle in accordance with this embodiment does not have to necessarily have the route searching unit 22, the object-to-be-captured extracting unit 23, the object-to-be-captured informing unit 24, the object-to-be-captured specifying unit 25, the image capture point determining unit 26, and the object-to-be-captured position determining unit 27 which are included in the CPU 11 of the image capturing system for vehicle in accordance with Embodiment 1.

In the image capturing system for vehicle in accordance with this Embodiment 4, when the image acquired through the image capturing is a still image, the time length of each of time intervals at which to capture the image or the like is set up as image capturing conditions, and is set to a camera control unit 28 by using an input unit 16. In contrast, when the image acquired through the image capturing is a moving image, the time length required to capture the image, the time length of each of time intervals at which to capture the image, or the like is set up as image capturing conditions, and is set to the camera control unit 28 by using the input unit 16. As an image capturing condition, the direction of a camera 18 or the distance to the object can be used.

Figure 13:
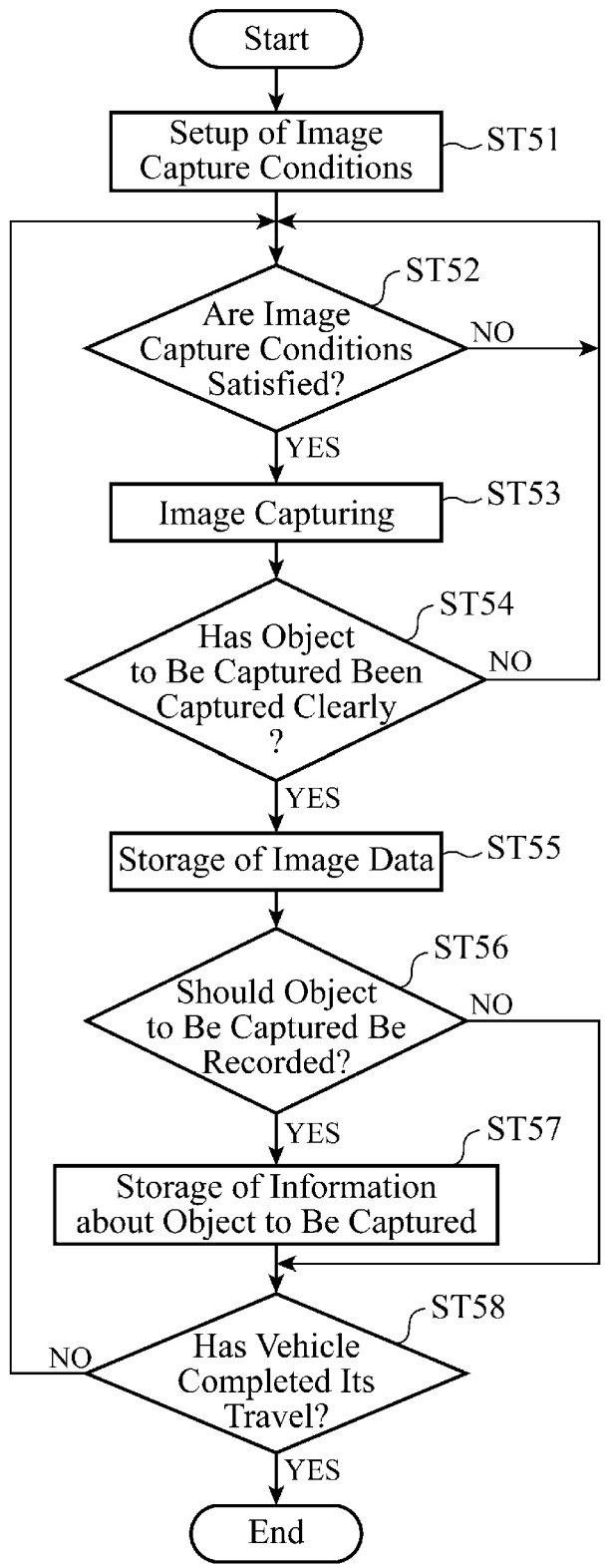
FIG. 13 is a flow chart showing the operation of an image capturing system for vehicle in accordance with Embodiment 4 of the present invention.

Next, the operation of the image capturing system for vehicle in accordance with Embodiment 4 of the present invention will be explained in detail with reference to a flow chart shown in FIG. 13.

First, an image capturing condition is setup (step ST51). More specifically, the user inputs an image capturing condition to the system via the input unit 16. This inputted image capturing condition is set to the camera control unit 28. It is then checked to see whether or not the image capturing condition is satisfied (step ST52). Concretely, when the distance between the object to be captured and the camera 18 is defined as the image capturing condition, for example, the camera control unit 28 checks to see whether the camera focuses on a distance satisfying the image capturing condition. When an image capture interval time length is defined as the image capturing condition, the camera control unit 28 checks to see whether a time to capture an image of the object has come after a lapse of an interval time of the length. When it is determined in this step ST52 that the image capturing condition is not satisfied, this step ST52 is repeatedly carried out until the image capturing condition is satisfied.

In contrast, when it is determined in step ST52 that the image capturing condition is satisfied, image capturing is carried out (step ST53). More specifically, when determining that the image capturing condition is satisfied, the camera control unit 28 informs the image capture commanding unit 29 to that effect. In response to the notification sent thereto from the camera control unit 28, the image capture commanding unit 29 commands the camera 18 to capture an image of the object to be captured. As a result, image capturing using the camera 18 is carried out. Image data acquired through the image capturing carried out by the camera 18 are sent to the determining unit 30.

It is then checked to see whether the camera has captured the object to be captured clearly (step ST54). More specifically, the determining unit 30 determines whether or not the image shown by the image data sent thereto from the camera 18 is a clearly-captured one of the object to be captured, in other words, whether or not the captured image is out of focus, by using image recognition. When it is determined in this step ST54 that the camera has not captured the object to be captured clearly, the image capturing system for vehicle returns the sequence to step ST52 and repeats the above-mentioned processing.

In contrast, when it is determined in step ST54 that the camera has captured the object to be captured clearly, the image data are then stored (step ST55). More specifically, the image data acquired by the camera 18 are stored in an information storage unit 17. It is then checked to see whether or not the object to be captured should be recorded (step ST56). More specifically, it is checked to see whether or not a command for recording the object to be captured has been issued by the input unit 16.

When it is determined in this step ST56 that the object to be captured should be recorded, the object to be captured is stored as object-to-be-captured information (step ST57). More specifically, information including the image capture point where the image data stored in step ST55 were acquired is stored in the object-to-be-captured information storage unit 12a as object-to-be-captured information. In contrast, when it is determined in step ST56 that the object to be captured does not have to be recorded, the process of step ST57 is skipped.

It is then checked to see whether the vehicle has completed its travel (step ST58). When it is determined in this step ST58 that the vehicle has not completed its travel, the image capturing system returns the sequence to step ST42 and repeats the above-mentioned processing. In contrast, when it is determined in step ST58 that the vehicle has completed its travel, the image capturing system ends the processing.

The image capturing system for vehicle in accordance with this Embodiment 4 differs from the image capturing system for vehicle in accordance with Embodiment 3 in that the image capturing system for vehicle in accordance with this Embodiment 4 captures an image of an area in the vicinity of the vehicle without using any object-to-be-captured information stored in the object-to-be-captured information storage unit 12a, and newly registers an image which the image capturing system is commanded to register by the user, among images acquired through the image capturing, in the object-to-be-captured information storage unit 12a as object-to-be-captured information.

INDUSTRIAL APPLICABILITY

An image capturing system for vehicle in accordance with the present invention can capture an image of an object to be captured automatically without the need for the driver to look at the screen of the image capturing system for vehicle even when the vehicle is traveling. As a result, the image capturing system for vehicle can capture an image of an object to be captured safely and correctly even when the vehicle is traveling. Furthermore, the user does not have to consider at which point an object to be captured can be captured satisfactorily, via which route he or she should drive the vehicle to capture an image of an object to be captured satisfactorily, etc. In addition, the user does not have to check where a famous object to be captured is and then input the address, the building name, or the like of the famous object to be captured so as to cause the image capturing system for vehicle to capture an image of the famous object to be captured. The image capturing system for vehicle can thus save the user from having to do any operation which requires a great deal of time to capture an image of such an object to be captured. Therefore, the image capturing system for vehicle in accordance with the present invention is suitable for use as an image capturing system for vehicle that captures an image of an object by using a camera mounted in a vehicle, and so on.

The invention claimed is:

1. An image capturing system for vehicle comprising:
a current position detecting unit for detecting a current position;
a map information storage unit for storing map information;
an object-to-be-captured information storage unit for storing information about an object to be captured on a map shown by the map information stored in said map information storage unit as object-to-be-captured information;
a camera for capturing an image of the object to be captured while a vehicle travels;
an object-to-be-captured position determining unit for determining both a distance from the current position detected by said current position detecting unit to the object to be captured shown by the object-to-be-captured information stored in said object-to-be-captured information storage unit, and a direction of said object to be captured, on a basis of the map information stored in said map information storage unit;
a camera control unit for controlling said camera to orient said camera toward the direction determined by said object-to-be-captured position determining unit, and to focus said camera on the determined distance;
an image capture commanding unit for commanding said camera controlled by said camera control unit to capture an image;
a determining unit for determining whether or not the image which is captured by said camera in response to the command from said image capture commanding unit is a clearly-captured one of said object to be captured; and
an information storage unit for, when said determining unit determines that the image captured by said camera is a clearly-captured one of said object to be captured, storing the image therein, wherein the image capturing system includes an image capture possible position determining unit for, when the determining unit determines that the image captured by said camera is not a clearly-captured one of the object to be captured, determining whether or not the object to be captured is at a position where an image of the object to be captured can be captured by the camera, and the object-to-be-captured position determining unit determines both the distance from the current position detected by the current position detecting unit to the object to be captured and the direction of said object to be captured on a basis of the map information stored in the map information storage unit again when said image capture possible position determining unit determines that the object to be captured is at a position where an image of the object to be captured can be captured by the camera.

2. The image capturing system for vehicle according to claim 1, wherein the image capturing system includes an image capture possible object detecting unit for detecting an object to be captured which the image capturing system for vehicle can capture on a basis of the object-to-be-captured information stored in the object-to-be-captured information storage unit and the current position detected by the current position detecting unit, and the object-to-be-captured position determining unit determines both a distance from the current position detected by said current position detecting unit to the object to be captured detected by said image capture possible object detecting unit and a direction of said object to be captured on a basis of the map information stored in said map information storage unit.

3. The image capturing system for vehicle according to claim 1, wherein the image capturing system for vehicle includes an input unit for inputting information, a route searching unit for searching for a route from the current position detected by the current position detecting unit to a destination inputted from said input unit, an object-to-be-captured extracting unit for extracting objects to be imaged existing along the route which is searched for by said route searching unit on a basis of the object-to-be-captured information stored in the object-to-be-captured information storage unit, and an object-to-be-captured specifying unit for specifying one of the objects to be imaged extracted by said object-to-be-captured extracting unit according to a command inputted from said input unit, and the object-to-be-captured position determining unit determines both the distance from the current position detected by said current position detecting unit to the object to be captured extracted by said object-to-be-captured extracting unit and the direction of said object to be captured on a basis of the map information stored in the map information storage unit.

4. The image capturing system for vehicle according to claim 3, wherein the image capturing system for vehicle includes an output unit for outputting information, and an object-to-be-captured informing unit for informing the objects to be imaged extracted by said object-to-be-captured extracting unit to said output unit as object-to-be-captured candidates, and the object-to-be-captured specifying unit specifies an object to be captured by selecting at least one of the object-to-be-captured candidates which are informed to said output unit by said object-to-be-captured informing unit according to the command from the input unit.

5. The navigation device according to claim 3, wherein the object-to-be-captured specifying unit specifies an object to be captured through direct specification of the object to be captured on the map shown by the map information stored in the map information storage unit from the input unit.

6. The image capturing system for vehicle according to claim 3, wherein the image capturing system for vehicle includes an image recapture selecting unit for, when the determining unit determines that the image captured by said camera is not a clearly-captured one of the object to be captured and the image capture possible position determining unit determines that the object to be captured is not at a position where an image of the object to be captured can be captured by the camera, causing said image capturing system for vehicle to select whether or not to recapture an image of said object to be captured, and, when said image recapture selecting unit has selected to recapture an image of said object to be captured, the route searching unit re-searches for a route including a point where said image capturing system can capture an image of the object to be captured which is to be recaptured.

7. The image capturing system for vehicle according to claim 6, wherein the image recapture selecting unit operates in either a mode in which the image recapture selecting unit selects whether or not to recapture an image of the object to be captured or a mode in which the image recapture selecting unit does not recapture an image of the object to be captured according to a command from the input unit.

8. The image capturing system for vehicle according to claim 3, wherein the input unit inputs image capturing conditions including the distance to the object to be captured, and the direction and a size of the object to be captured, and the object-to-be-captured extracting unit extracts objects to be imaged satisfying the image capturing conditions inputted from said input unit from among the objects to be imaged existing along the route which is searched for by the route searching unit.

9. The image capturing system for vehicle according to claim 1, wherein when the image captured by the camera includes a person who can be identified, said image capturing system discards said image.

10. The image capturing system for vehicle according to claim 1, wherein said image capturing system includes a data input/output unit for reading image data stored in the information storage unit, or storing image data in said information storage unit.

11. The image capturing system for vehicle according to claim 1, wherein said image capturing system includes a sound recording unit for recording a sound in synchronization with the image capturing and storing the recorded sound in the information storage unit.

* * * * *